Patented Nov. 7, 1922.

1,434,892

UNITED STATES PATENT OFFICE.

MARION M. HARRISON AND HAROLD A. MORTON, OF AKRON, OHIO, ASSIGNORS TO THE MILLER RUBBER COMPANY, OF AKRON, OHIO, A CORPORATION OF OHIO.

PROCESS OF MANUFACTURING VULCANIZED-RUBBER ARTICLES.

No Drawing.   Application filed March 5, 1921.   Serial No. 449,910.

*To all whom it may concern:*

Be it known that we, MARION M. HARRISON and HAROLD A. MORTON, citizens of the United States, and residents of Akron, in the county of Summit and State of Ohio, have invented certain new and useful Improvements in Processes of Manufacturing Vulcanized-Rubber Articles, of which the following is a specification.

Our present invention relates to improvements in processes of manufacturing vulcanized rubber articles and is especially advantageous in the manufacture of rubber in sheet or slab form.

Sheets or layers of rubber are customarily formed by passing the rubber compound containing the vulcanizing and other ingredients through a calender which rolls it into a sheet of determined thickness, and the closer the rolls are set together the more perfect the resulting sheet.

Therefore, where thicker sheets or slabs were required, they were formed from a plurality of superimposed calendered plies which were thereafter vulcanized together by the application of the requisite heat.

In the formation of such sheets or slabs considerable difficulty has been experienced, due to the tendency of the rubber to vulcanize upon the mill and calender rolls. The mill rolls being driven at differential speed, work the rubber upon itself and thus generate heat, it being understood that all rubber compounds are first warmed up on the mill before calendering, and especially where so-called accelerators are used to reduce the degree of vulcanizing heat required, or shorten the vulcanizing period, which is desirable in the interests of economy, the degree of heat attained may cause vulcanization to take place prematurely.

When vulcanization or partial vulcanization takes place on the calender or mill the compound is almost a total loss.

We have discovered that we can incorporate in separate batches of rubber compound ingredients which, taken separately, will not cause the rubber to vulcanize at any temperature reached either on the mill or calender rolls; but when such batches are run into thin sheets or plies and the plies superimposed upon each other, the ingredients under the action of a mild heat will migrate or interpenetrate and effect vulcanization.

In proceeding, therefore, according to our invention, we mix and suitably mill separate batches of rubber, one of which contains sulphur in the proper proportions and the other an organic accelerator. These are separately run through calenders of the ordinary or any desired type and formed thereby into thin sheets or plies, one of which is placed on a liner, and another thereupon, successive plies being applied until a sheet or slab of the requisite thickness is secured, the plies containing alternately sulphur and accelerator.

As the compound containing sulphur only will not vulcanize at a temperature below the melting point of sulphur and as the compound containing the accelerator only will not vulcanize at any temperature, both batches may be milled out and calendered without any danger of vulcanization or partial vulcanization prior to the assembly of the plies.

After the plies have been assembled or superimposed as above described, the assembly is subjected to a mild heat which causes the sulphur and the accelerator to migrate or interpenetrate with the result that they both become equally distributed throughout the adjacent sheets and effect uniform vulcanization of the whole.

By this method, compounds may be used which will vulcanize at moderate temperatures far below that ordinarily used, thus resulting in a material saving in costs, as saving in heat in vulcanization means a substantial saving in expense of production, and at the same time the freedom from liability of premature vulcanization or partial vulcanization on the mill and calender means a further reduction of cost, due to elimination of waste.

In practicing our improved process, sulphur is used as the migratory material of one of the batches and an organic accelerator as the migratory ingredient of the other batch.

As an example of accelerators which we have found suitable may be mentioned the product of dimethyl amine and carbon bisulphide, known as dimethyl-ammonium-dimethyl-dithio-carbamate and the piperidine salt of carbon bisulphide, known as piperidine-piperidyl-dithio-carbamate.

Some accelerators work better in the presence of zinc and batch proportions which we have found to give excellent results are as follows:

*One batch.*

| | |
|---|---|
| Smoked sheet | 96.5 |
| Zinc oxide | 2.0 |
| Sulphur | 1.5 |
| | 100.0 |

*Other batch.*

| | |
|---|---|
| Smoked sheet | 97.25 |
| Zinc oxide | 2.00 |
| Dimethylamine carbon disulphide product | .75 |
| | 100.00 |

Mill two rubber compounds, A and B separately in the usual manner, the composition being as follows:

*Stock A.*

| | |
|---|---|
| Smoked sheets | 96.5 |
| Sulphur | 1.5 |
| Zinc oxide | 2.0 |
| | 100.0 |

*Stock B.*

| | |
|---|---|
| Smoked sheets | 97.25 |
| Dimethyl amine carbon disulphide compound | .75 |
| Zinc oxide | 2.00 |
| | 100.0 |

Then calender a sheet of stock A having a thickness of 0.015 inches; on top of this sheet lay a ply of stock B of the same thickness; next to ply B lay another ply of A and on top of this ply of B, both these layers being of the same thickness as before. The final sheet of rubber may be represented by the following scheme:

| | |
|---|---|
| Stock A | 0.015 inches thickness. |
| Stock B | 0.015 inches thickness. |
| Stock A | 0.015 inches thickness. |
| Stock B | 0.015 inches thickness. |

The final plied stock, consisting of four plies, two of each stock, had a thickness of 0.060 inches.

A roll of the above stock may be cured in twenty hours at 150 degrees F. dry heat.

While it is perfectly satisfactory in most cases to make the two plies equal in thickness, it is possible to obtain a more evenly curing product by varying the ratio of the thickness of the complementary plies according to the rate of migration of the active components. Thus, if the accelerator migrates more slowly than sulphur, the sulphur ply should be correspondingly thinner. Of course, in such a case the percentage of active materials in the plies should be changed accordingly. The above example is suitable for plies of equal thickness. The actual thickness of the plies may be varied considerably. In general it may be said that the thinner the plies, the more even the cure throughout. We have found it convenient to make the plies 1/128 inch in thickness, but have been able to use several times this gauge under certain conditions.

Having now described our invention, what we claim is:—

1. The herein described method of forming a sheet or slab of rubber which consists in superposing one upon the other a plurality of plies of rubber compound, one ply containing sulphur and an adjoining ply an accelerator.

2. The herein described method of forming a sheet or slab of rubber which consists in superposing one upon the other a plurality of plies of rubber compound, one ply containing sulphur and the other an accelerator, and thereafter raising the temperature of the superimposed plies.

3. The herein described method of forming a rubber article which comprises superposing upon each other a plurality of plies to secure the required thickness, said plies containing alternately sulphur and an accelerator.

4. The herein described method of forming a vulcanized rubber compound which consists in bringing together a plurality of plies of rubber, adjoining plies containing respectively ingredients which are migratory under moderate heat but which plies are individually non-vulcanizable under such moderate heat, and thereafter raising the temperature of the adjoined plies to effect migration of the ingredients and vulcanization of the article.

5. The herein described method of forming a vulcanized rubber sheet or slab which consists in mixing separate batches of rubber compound, one batch containing sulphur and another batch an accelerator, separately calendering said batches into sheets and thereafter superposing said sheet and vulcanizing them together.

6. The herein described method of forming a sheet or slab of vulcanizable rubber compound which consists in juxtaposing a plurality of plies of rubber compound containing separately ingredients which are migratory under moderate heat and which together will effect vulcanization but which individually render the respective plies non-vulcanizing under such heat, the ratio of the thickness of the plies being inversely proportional to the migratory speed of the ingredients.

7. The herein described method of forming a sheet or slab of rubber which consists in superposing one upon the other a plurality of plies of rubber compound, one ply containing sulphur and zinc oxide and an adjoining ply an accelerator in the presence of zinc oxide.

In testimony whereof we affix our signatures.

MARION M. HARRISON.
HAROLD A. MORTON.